United States Patent
Yamamoto et al.

(10) Patent No.: US 11,266,248 B2
(45) Date of Patent: Mar. 8, 2022

(54) ARMREST

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO RIKO COMPANY LIMITED, Aichi (JP); TOKAI CHEMICAL INDUSTRIES, LTD., Gifu (JP)

(72) Inventors: Satoshi Yamamoto, Mie (JP); Makoto Higashikozono, Mie (JP); Kaho Hayashi, Mie (JP); Hideki Oshima, Aichi (JP); Takahiko Endo, Gifu (JP); Keiji Makino, Gifu (JP); Jun Jin, Gifu (JP); Takemasa Okumura, Gifu (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO RIKO COMPANY LIMITED, Aichi (JP); TOKAI CHEMICAL INDUSTRIES, LTD., Gifu (JP)

( * ) Notice: Subject to any disclaimer, the term of this patent is extended or adjusted under 35 U.S.C. 154(b) by 0 days.

(21) Appl. No.: 16/967,933

(22) PCT Filed: Jan. 23, 2019

(86) PCT No.: PCT/JP2019/001973
§ 371 (c)(1),
(2) Date: Aug. 6, 2020

(87) PCT Pub. No.: WO2019/155878
PCT Pub. Date: Aug. 15, 2019

(65) Prior Publication Data
US 2021/0030157 A1  Feb. 4, 2021

(30) Foreign Application Priority Data
Feb. 9, 2018  (JP) .............................. JP2018-022261

(51) Int. Cl.
*A47C 7/54* (2006.01)
*H02G 11/00* (2006.01)

(52) U.S. Cl.
CPC .............. *A47C 7/541* (2018.08); *A47C 7/546* (2013.01); *H02G 11/00* (2013.01)

(58) Field of Classification Search
CPC .......... B60N 2/753; B60N 2/767; A47C 7/543
(Continued)

(56) References Cited

U.S. PATENT DOCUMENTS

| 3,880,466 A * | 4/1975 | Brennan ................. B60N 2/753 297/411.32 |
| 2002/0109388 A1* | 8/2002 | Magnuson ............. B60N 2/753 297/411.38 |

(Continued)

FOREIGN PATENT DOCUMENTS

| JP | 11-18875 | 1/1999 |
| JP | 2001-45641 | 2/2001 |

(Continued)

OTHER PUBLICATIONS

Official Communication issued in International Patent Application No. PCT/JP2019/001973, dated Apr. 23, 2019, along with English translation.

(Continued)

*Primary Examiner* — Sarah B McPartlin
(74) *Attorney, Agent, or Firm* — Greenblum & Bernstein, P.L.C.

(57) ABSTRACT

An armrest according to the technology described herein includes a bracket, an armrest body, a device connecting (Continued)

port, an armrest-side connector, and a cable. The bracket is fixed to a seat frame. The armrest body is attached to the bracket to be rotatable. The device connecting port is exposed through an outer surface of the armrest body. The armrest-side connector is fixed to the seat frame at a position different from the bracket. The cable includes an end connected to the device connecting port and an end connected to an armrest-side connector. The armrest body includes a cable retaining portion through which the cable is passed and in which the cable is retained. Any one of the bracket and the armrest body includes a hole (an elongated hole) that allows movement of the cable along with rotation of the armrest body.

5 Claims, 12 Drawing Sheets

(58) Field of Classification Search
USPC .................................................. 297/411.38
See application file for complete search history.

(56) References Cited

U.S. PATENT DOCUMENTS

| 2005/0082861 | A1 | 4/2005 | Kubota et al. |
| 2005/0275271 | A1* | 12/2005 | Magnuson ............... B60N 2/79 |
| | | | 297/411.38 |
| 2013/0264851 | A1 | 10/2013 | Kim et al. |
| 2021/0031660 | A1* | 2/2021 | Yamamoto ............. B60N 2/797 |

FOREIGN PATENT DOCUMENTS

| JP | 2005-119475 | 5/2005 |
| JP | 2013-216162 | 10/2013 |
| JP | 2013-220781 | 10/2013 |
| JP | 2016-107686 | 6/2016 |

OTHER PUBLICATIONS

Official Communication issued in International Patent Application No. PCT/JP2019/001973, dated Aug. 22, 2019, along with English translation.

* cited by examiner

ARMREST

TECHNICAL FIELD

The technology described herein relates to an armrest.

BACKGROUND ART

An armrest for a vehicle seat described in Japanese Unexamined Patent Application Publication 2016-107686 (PATENT DOCUMENT 1) has been known. The armrest includes a holder and an armrest body. The holder has a box shape with an opening. The armrest body includes an armrest surface and a lid that covers and uncovers the opening of the holder. The armrest body is attached to an attachment base of a vehicle body via a connecting member to be rotatable. The holder includes a socket inside. A connecting cable of a portable device may be connected to the socket. An internal cable inside the socket is connected to a console cable through the armrest body, the connecting member, and the attachment base.

RELATED ART DOCUMENT

Patent Document

[PATENT DOCUMENT 1]
Japanese Unexamined Patent Application Publication 2016-107686

SUMMARY OF THE INVENTION

Problem to be Solved by the Invention

The armrest may be disposed on a console between a driver's seat and a passenger's seat. In this case, a space is provided between the armrest body and the attachment base for the connecting member. The space can accept an extra section of the cable required for rotation of the armrest can be stored in the connecting member. If the armrest is disposed beside the vehicle seat, the armrest body is directly attached to a sidewall of the vehicle seat, that is, the connecting member is not present. Therefore, it is difficult to include the extra section in the cable.

Means for Solving the Problem

An armrest according to the technology described herein includes a bracket, an armrest body, at least one device connecting port, an armrest-side connector, and a cable. The bracket is fixed to the seat frame. The armrest body is attached to the bracket to be rotatable. The at least one device connecting port is exposed through an outer surface of the armrest body. The armrest-side connector is fixed to the seat frame at a position different from the bracket. The cable includes an end that is connected to the at least one device connecting port and an end that is connected to the armrest-side connector. The armrest body includes a cable retaining portion through which the cable is passed and in which the cable is retained. Any one of the bracket and the armrest body includes a hole that allows movement of the cable along with rotation of the armrest body.

During the rotation of the armrest body, the cable pulled out of the cable retaining portion of the armrest body toward the seat frame via the hole in the bracket rotates along with the armrest body. The armrest-side connector is connected to the seat-side connector and fixed to the seat frame. Therefore, the cable requires an extra section between the hole and the armrest-side connector. In the configuration described above, the hole is provided in any one of the bracket and the armrest body. Therefore, the cable can freely move within the hole that allows the movement of the cable and thus the armrest body can rotate with the cable that includes the extra section set in the limited space.

The armrest according to the technology described herein may have the following configurations.

The hole may be an elongated hole.

The hole may be a clearance hole rather than the elongated hole. However, with the elongated hole, foreign substances are less likely enter into the bracket or the armrest body. The elongated hole has such an advantage over the clearance hole.

A cable holder may be provided to hold the cable to the armrest body at an end of the cable retaining portion on an opposite side from the at least one device connecting port. The elongated hole may be provided in the bracket. The elongated hole may be in an arc form with a rotation axis of the armrest body as a center of curvature. The cable pulled out of the cable holder toward the bracket may move in the elongated hole along with the rotation of the armrest body.

In the configuration, the elongated hole is provided in the bracket and in the arc form with the rotation axis of the armrest body as the center of curvature. Therefore, a distance between the cable holder and the elongated hole remains constant.

The armrest body may be rotatable between a horizontal position and a vertical position. The at least one device connecting port may include a front device connecting port and a rear device connecting port. The front device connecting port may be disposed at a front end of the armrest body in the horizontal position. The rear device connecting port may be disposed at a rear end of the armrest body in the horizontal position.

According to the configuration, an occupant of a vehicle in a front seat can use the front device connecting port and an occupant in a rear seat can use the rear device connecting port. Namely, the device connecting ports are provided for both the front seat and the rear seat.

The rear device connecting port may be disposed more to a rear side than a vertical axis that passes the rotation axis of the armrest body in the vertical direction in the horizontal position. The rear device connecting port may be disposed more to the rear side than the vertical axis that passes the rotation axis of the armrest body in the vertical direction in the vertical position.

According to the configuration, the rear device connecting port can be used in either position.

The bracket may include a guide pin. The armrest body may include a guide hole that is in an arc form with the rotation axis of the armrest body as a center of curvature to guide the guide pin along with the rotation of the armrest body.

According to the configuration, the rotation of the armrest body can be guided through movement of the guide pin in the guide hole. Further, a load applied to the armrest body is less likely to be concentrated on the rotation axis and the load is spread to the guide pin.

According to the armrest disclosed herein, the armrest body can rotate with the cable that includes the extra section.

MODES FOR CARRYING OUT THE INVENTION

Embodiment

Figure 1:
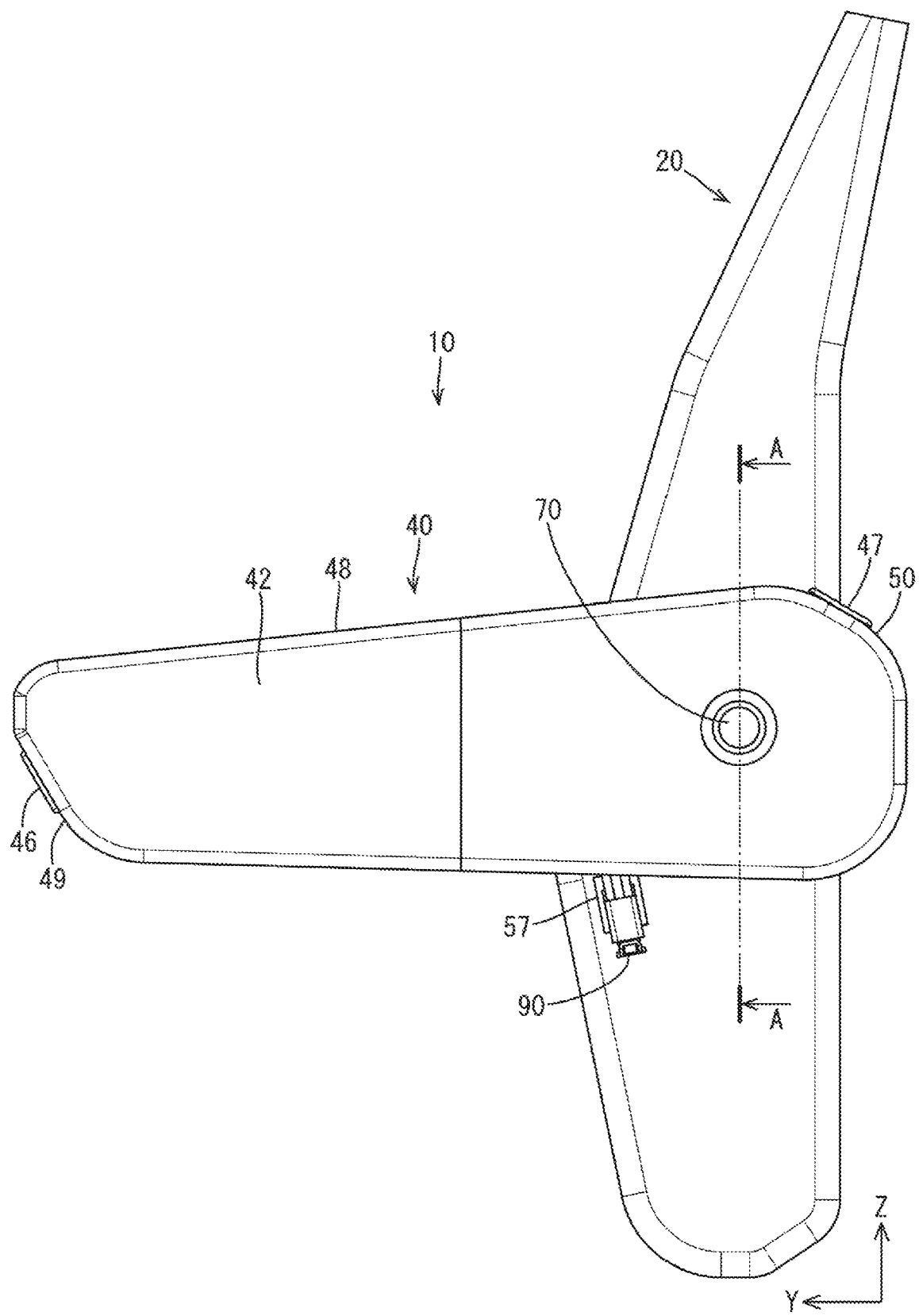
FIG. 1 is a side view of an armrest in a horizontal position.

An embodiment will be described with reference to FIGS. 1 to 12. An armrest 10 according to this embodiment may be attached to a sidewall of a vehicle seat, which is not illustrated. The armrest 10 includes a bracket 30, an armrest body 40, a cable 80, and a seat-side connector 90. Hereinafter, a Z direction, a Y direction, and an X direction point to an upper side, a front side, and a left side, respectively. For components having the same configuration, only one of them may be indicated by a symbol and others may not be indicated by the symbol.

Figure 3:
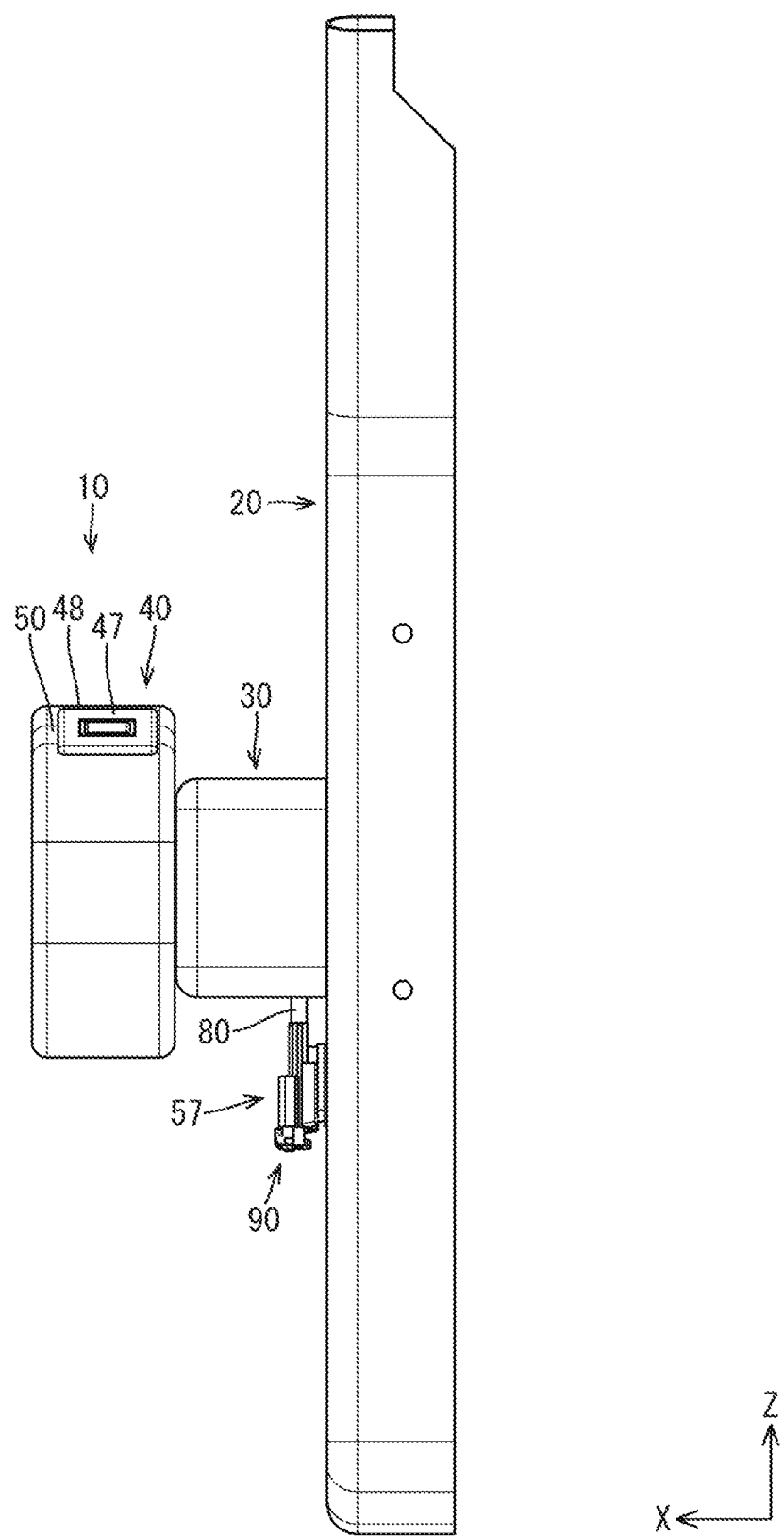
FIG. 3 is a rear view of the armrest in the horizontal position.
Figure 4:
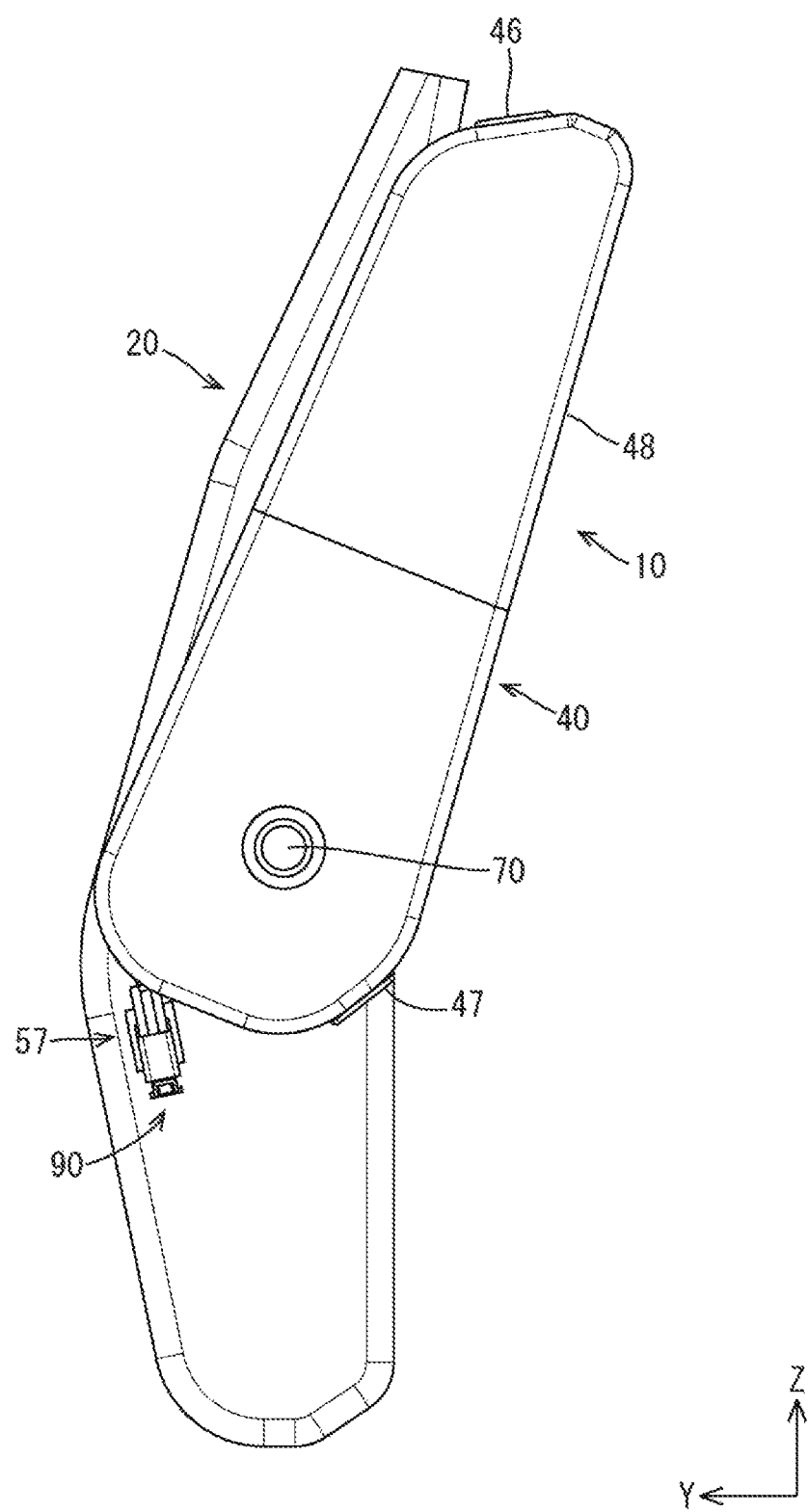
FIG. 4 is a side view of the armrest in a vertical position.
Figure 5:
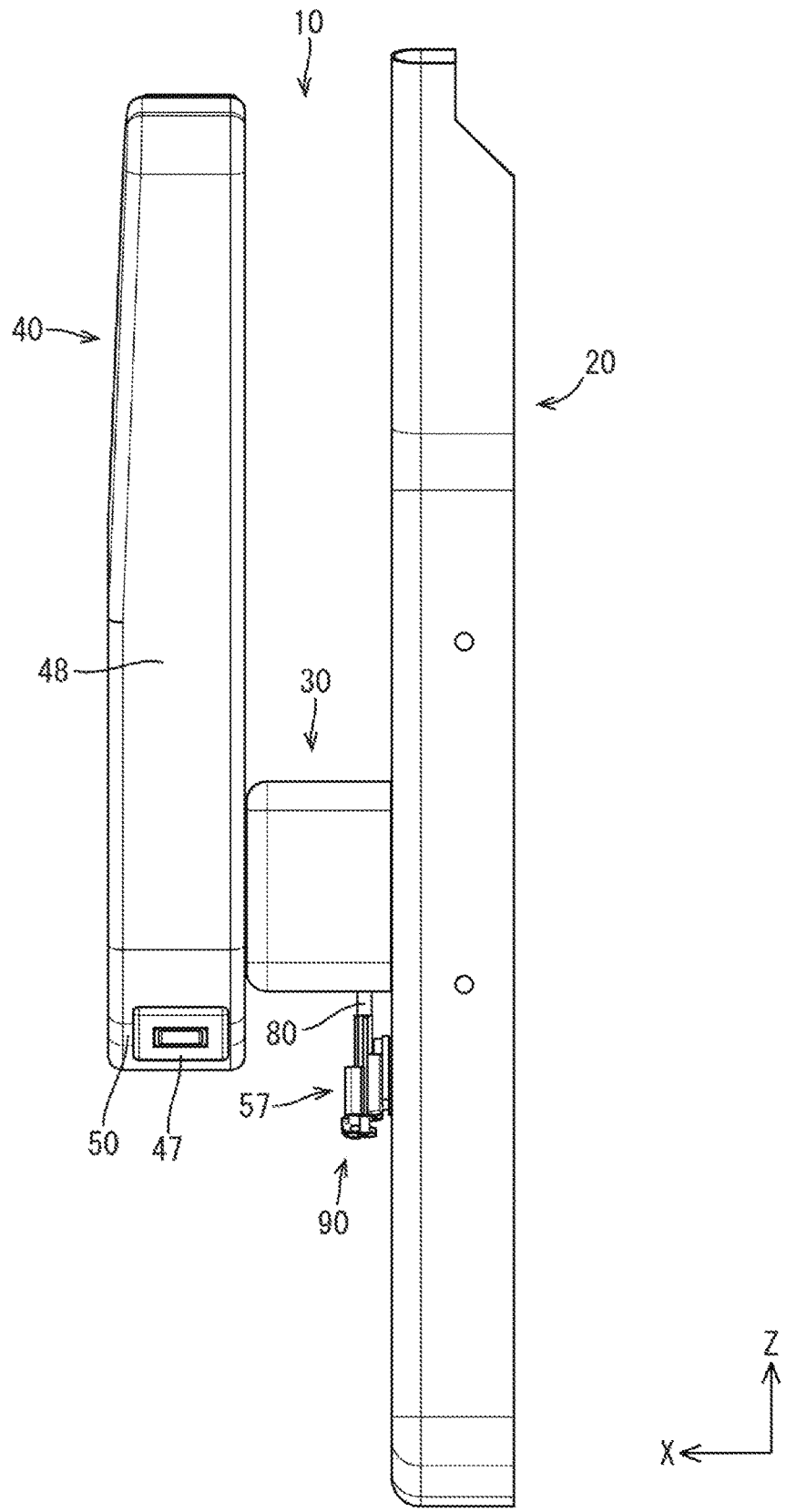
FIG. 5 is a rear view of the armrest in the vertical position.

Symbol 20 in FIG. 1 indicates a seat frame included in a vehicle seat. The seat frame 20 constitutes a side portion of the vehicle seat. As illustrated in FIG. 3, the bracket 30 is fixed to a side of the seat frame 20 by welding. The seat frame 20 and the bracket 30 are prepared by pressing sheet metals having high rigidity. Although not illustrated, a backrest cushion is attached on the seat frame. A side of the backrest cushion contacts a side of the armrest body 40.

Figure 2:
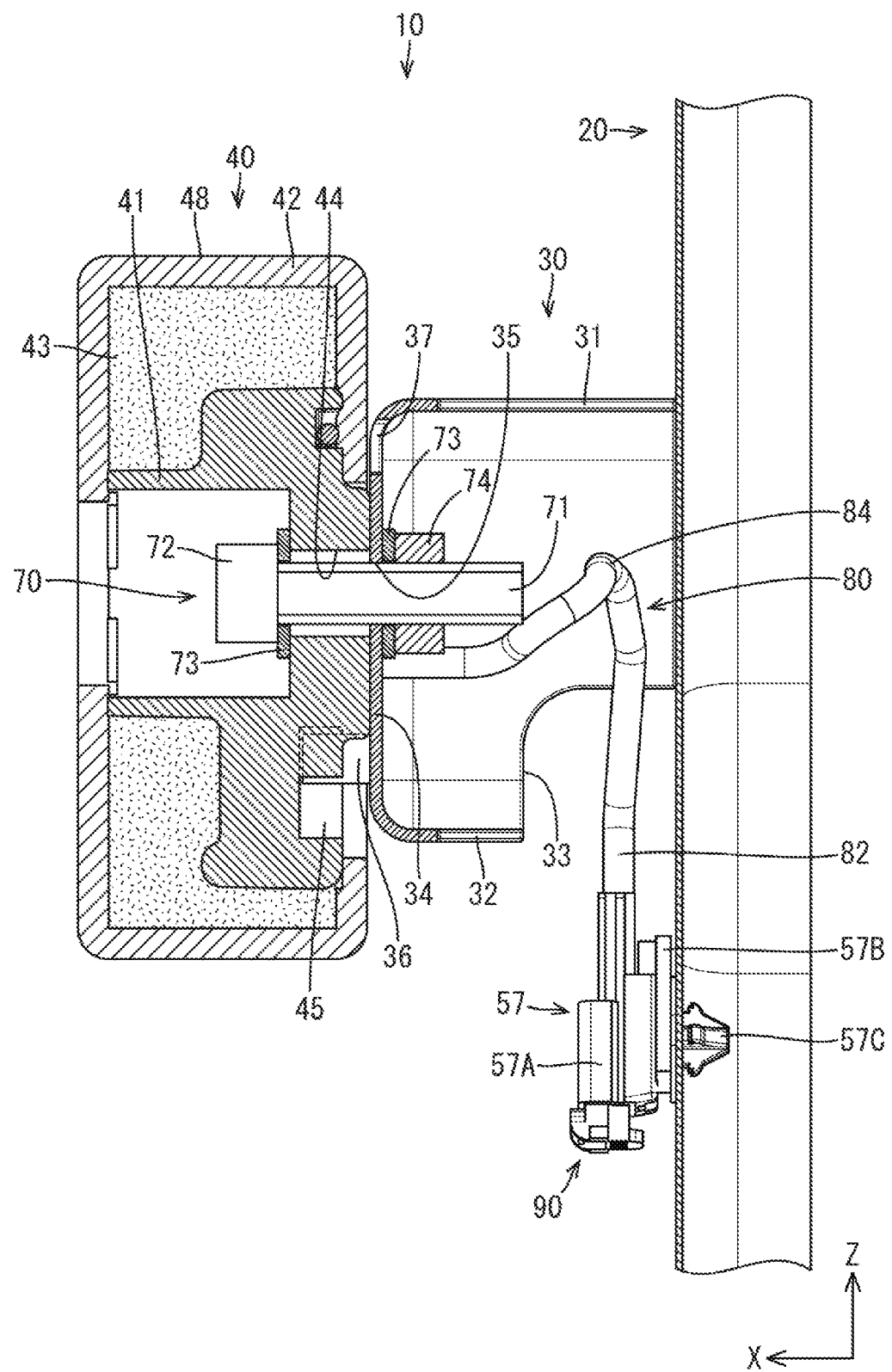
FIG. 2 is a cross-sectional view along line A-A in FIG. 1.
Figure 6:
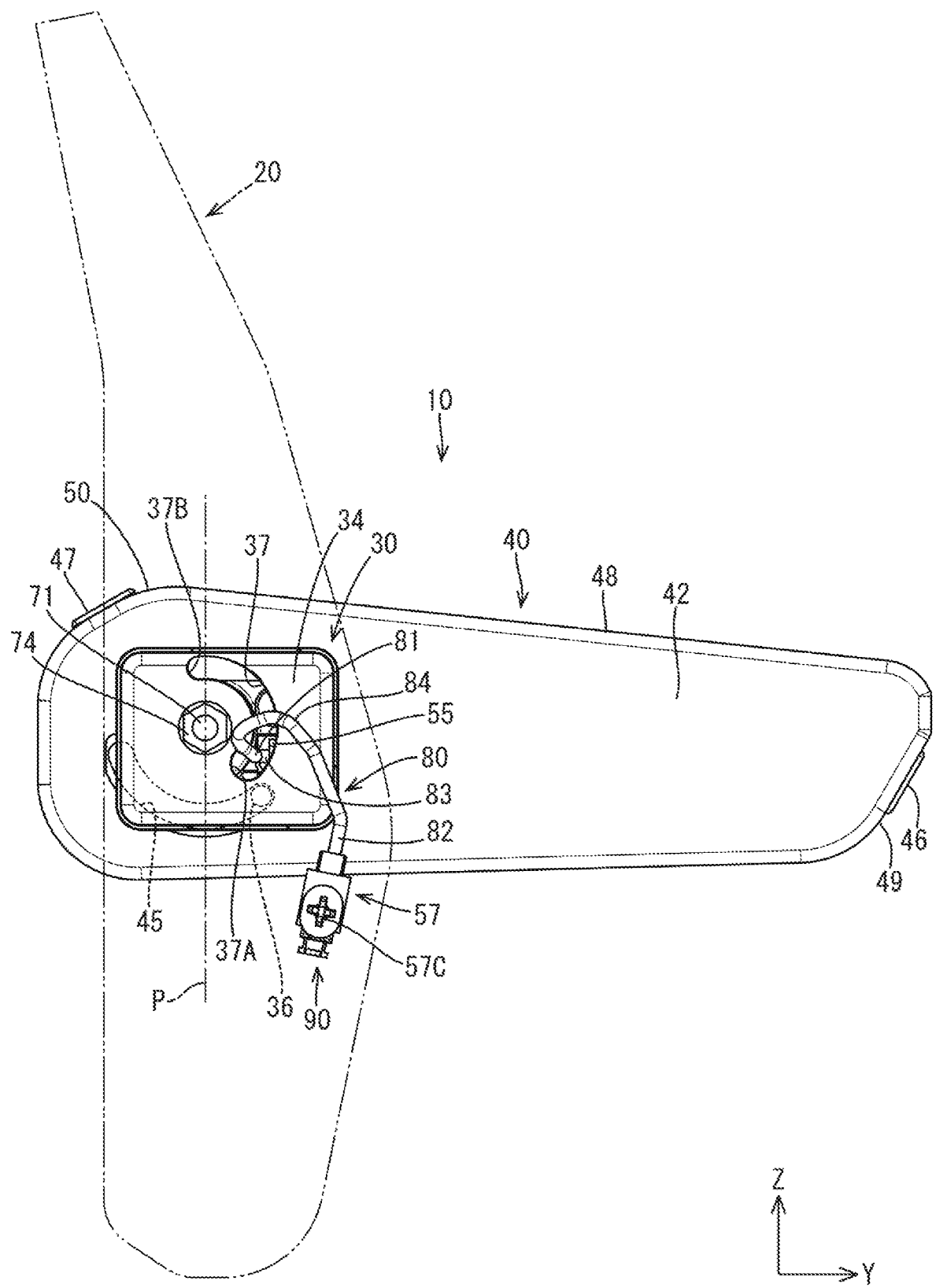
FIG. 6 is a side view of an armrest body in a horizontal position viewed from a bracket side.

As illustrated in FIGS. 3 and 6, the bracket 30 has a box shape with an opening on a seat frame 20 side. When viewed from the seat frame 20 side, the shape of the bracket 30 is horizontally-long rectangular. As illustrated in FIG. 2, the bracket 30 includes an upper through hole 31 and a lower through hole 32 that open from an upper side to a lower side. At a section of a hole edge of the lower through hole 32 on the seat frame 20 side, a cutout 33 that is cut out upward is provided.

The bracket 30 includes an attachment wall 34 located on an opposite side from the seat frame 20 and to which the armrest body 40 is attached. As illustrated in FIG. 1, the armrest body 40 has a long dimension in a front-rear direction. The armrest body 40 includes a frame 41, a cover 42 and a foam 43. The frame 41 is made of synthetic resin. The cover 42 covers the frame 41. A space between the frame 41 and the cover 42 is filled with the foam 43. To protect the cable 80 from stress of thermal expansion and contraction due to temperature change in a vehicle, it is preferable that the foam 43 is made of flexible material. A urethane foam, foam beads, and TIP urethane may be used for the foam 43.

As illustrated in FIG. 2, the armrest body 40 has a vertically-long rectangular cross section. The armrest body 40 is attached to the attachment wall 34 of the bracket 30 to be rotatable about a shank 71 of a bolt 70. The frame 41 includes a bolt hole 44 to receive the shank 71 of the bolt 70. A washer 73 is sandwiched between a hole edge of the bolt hole 44 and a head 72 of the bolt 70. The attachment hole 34 includes a bolt hole 35 to receive the shank 71 of the bolt 70. The shank 71 that is passed through the bolt hole 35 projects into the bracket 30. A nut 74 is threaded onto the shank 71. A washer 73 is sandwiched between a hole edge of the bolt hole 35 and the nut 74.

A guide pin 36 protrudes from a lower section of a surface of the attachment wall 34 on an armrest body 40 side. As illustrated in FIG. 6, the frame 41 includes a guide hole 45 in an arc form with the shank 71 of the bolt 70 as a center of curvature. The guide pin 36 is fitted in the guide hole 45. As the guide pin 36 moves in the guide hole 45, rotation of the armrest body 40 is guided. If a load is applied to the armrest body 40, the load is not concentrated on the shank 71 of the bolt 70 and spread to the shank 71 and the guide pin 36.

Figure 7:
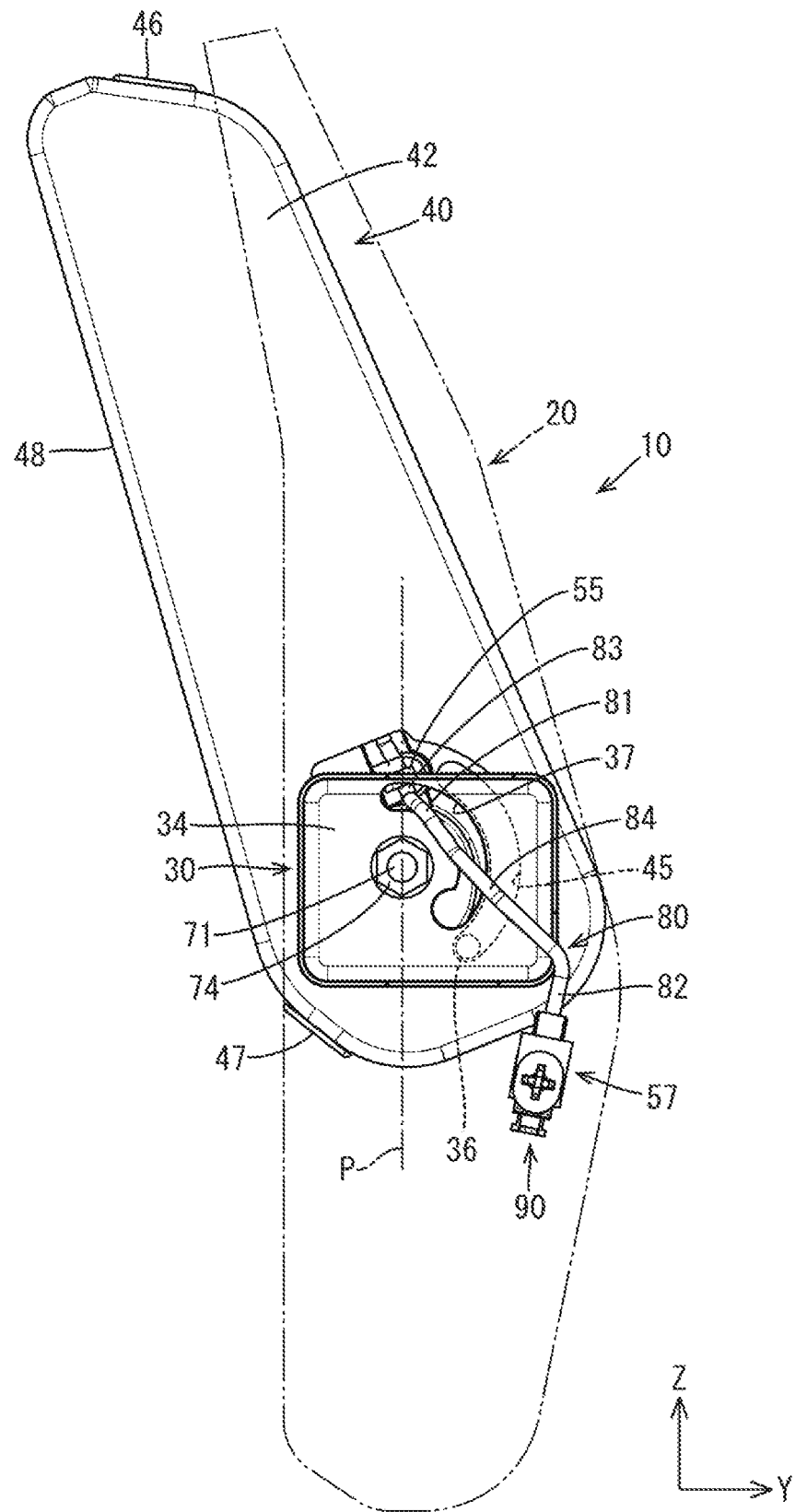
FIG. 7 is a side view of the armrest body in a vertical position viewed from the bracket side.
Figure 8:
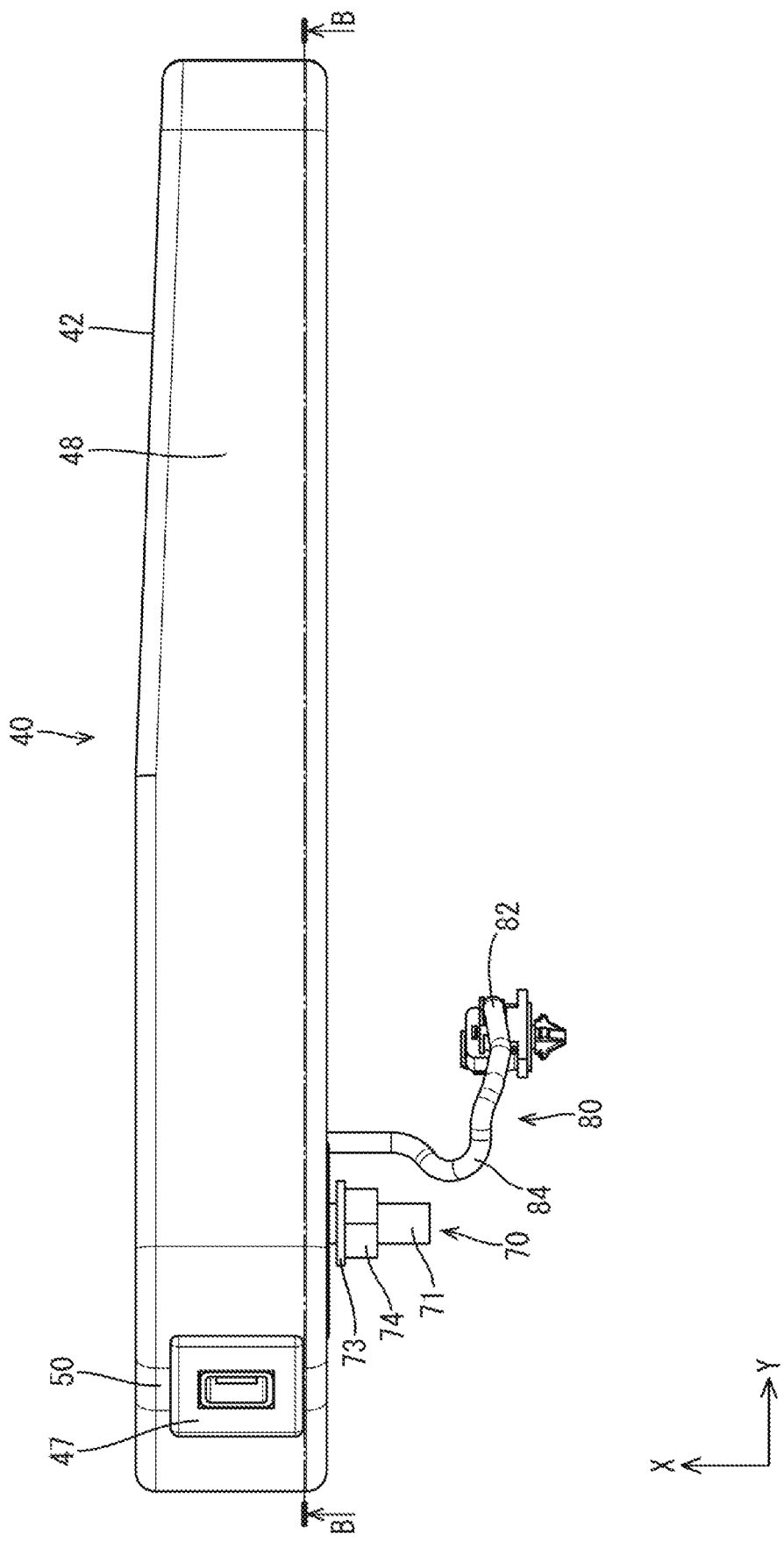
FIG. 8 is a plan view of the armrest body.

The armrest body 40 is rotatable between the horizontal position illustrated in FIG. 6 and the vertical position illustrated in FIG. 7. In the horizontal position, the armrest body 40 has a long dimension in the horizontal direction. In the vertical position, the armrest body 40 has the long dimension in the vertical direction. A front end of the armrest body 40 in the horizontal position includes a front device connecting port 46. A rear end of the armrest body 40 in the horizontal position includes a rear device connecting port 47. The device connecting ports 46 and 47 may be universal serial bus (USB) ports into which USB terminals are plugged for connecting portable devices.

As illustrated in FIG. 6, the armrest body 40 includes an armrest surface 48 on which an occupant of the vehicle rest his or her arm. A front end of the armrest surface 48 communicates with a front sloped surface 49 that declines toward the rear side. A rear end of the armrest surface 48 communicates with a rear sloped surface 50 that gently declines toward the rear side. The front device connecting port 46 slightly projects from the front sloped surface 49 to be exposed from the outer surface of the armrest body 40. The rear device connecting port 47 slightly projects from the rear sloped surface 50 to be exposed through the outer surface of the armrest body 40.

As illustrated in FIG. 6, the rear device connecting port 47 is disposed more to the rear side than a vertical axis P that passes through the shank 71 of the bolt 70 in the vertical direction in the horizontal position. As illustrated in FIG. 7, the rear device connecting port 47 is disposed more to the rear side than the vertical axis P that passes through the shank 71 of the bold 70 in the vertical direction in the vertical position. Namely, an occupant of the vehicle in a rear seat can plug an USB connector into the rear device connecting port 47 in either position.

Figure 9:
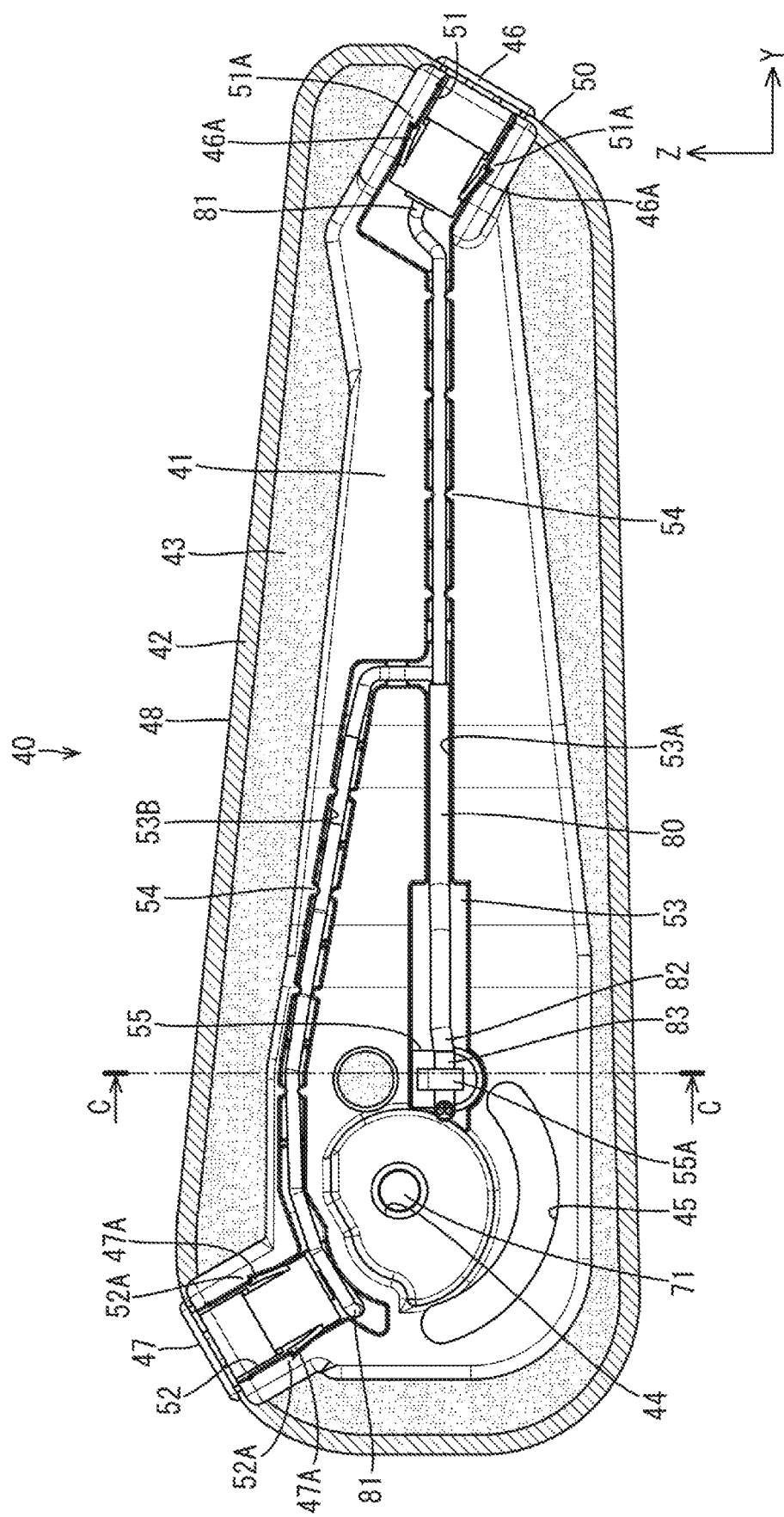
FIG. 9 is a cross-sectional view along line B-B in FIG. 8.

As illustrated in FIG. 9, the front device connecting port 46 is disposed in a front hole 51 in a front end portion of the frame 41. Front fitting pieces 46A are provided at sides of the front device connecting port 46, respectively. Front fitting piece receiving portions 51A are provided inside the front hole 51 in which the front fitting pieces 46A are fitted, respectively. According to the configuration, the front device connecting port 46 is held inside the front hole 51 and not released from the front hole 51.

The rear device connecting port 47 is disposed in a rear hole 52 in a rear end portion of the frame 41. Rear fitting pieces 47A are provided at sides of the rear device connecting port 47, respectively. Rear fitting piece receiving portions 52A are provided inside the rear hole 52 in which the rear fitting pieces 47A are fitted, respectively. According to the configuration, the rear device connecting port 47 is held inside the rear hole 52 and not released from the rear hole 52.

A section of a sidewall of the frame 41 is recessed and defined as a cable retaining portion 53 for passing and retaining the cable 80. Sidewalls of the cable retaining portion 53 include retaining projections 54. When the cable 80 is pushed in the cable retaining portion 53, the cable 80 is pressed and held with the retaining projections 54 from both sides. The cable retaining portion 53 includes a first routing section 53A and a second routing section 53B. The first routing section 53A extends in the front-rear direction. The second routing section 53B branches off the first routing section 53A upward and then extends rearward. A front end of the first routing section 53A communicates with the front hole 51. A rear end of the second routing section 53B communicates with the rear hole 52.

Figure 10:
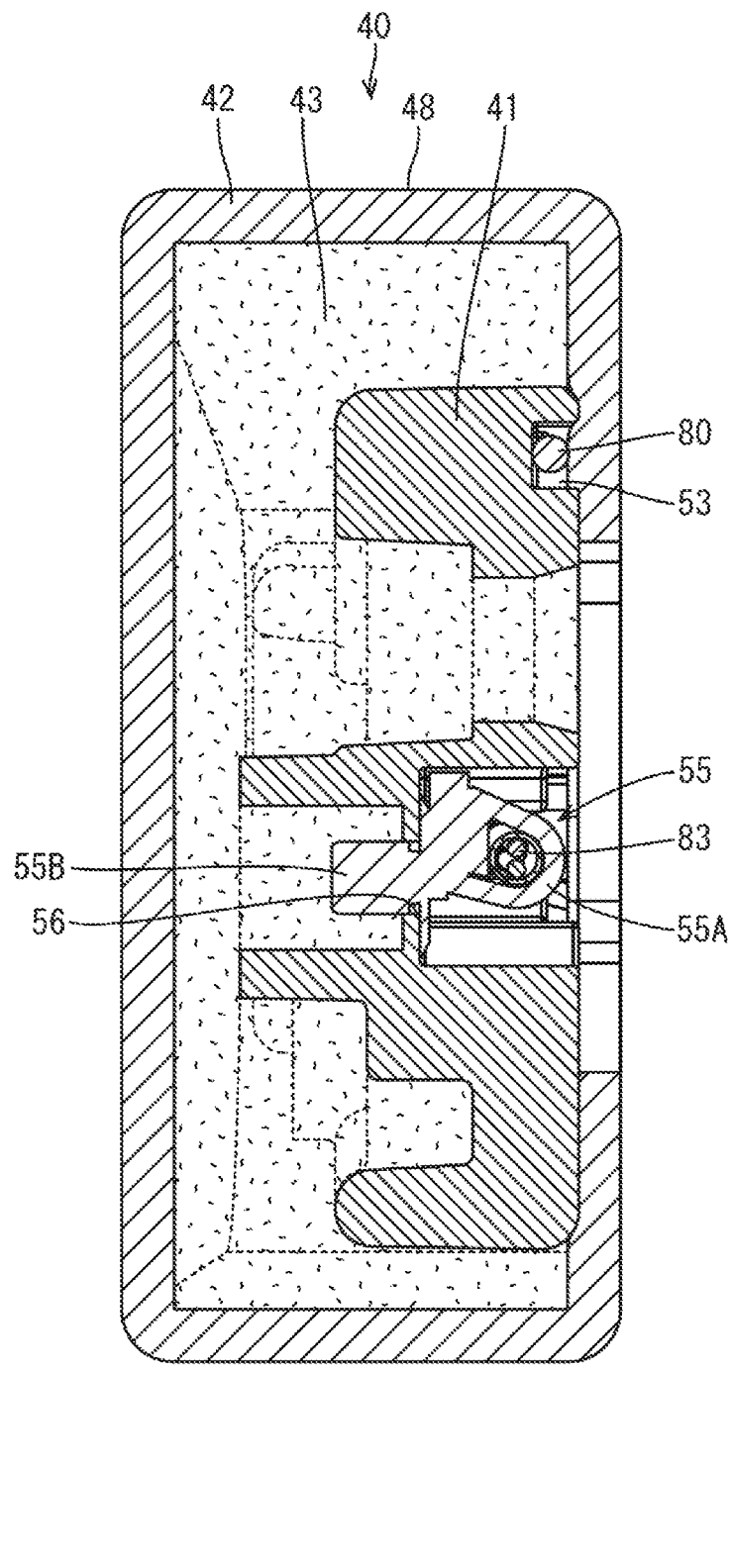
FIG. 10 is a cross-sectional view along line C-C in FIG.
Figure 11:
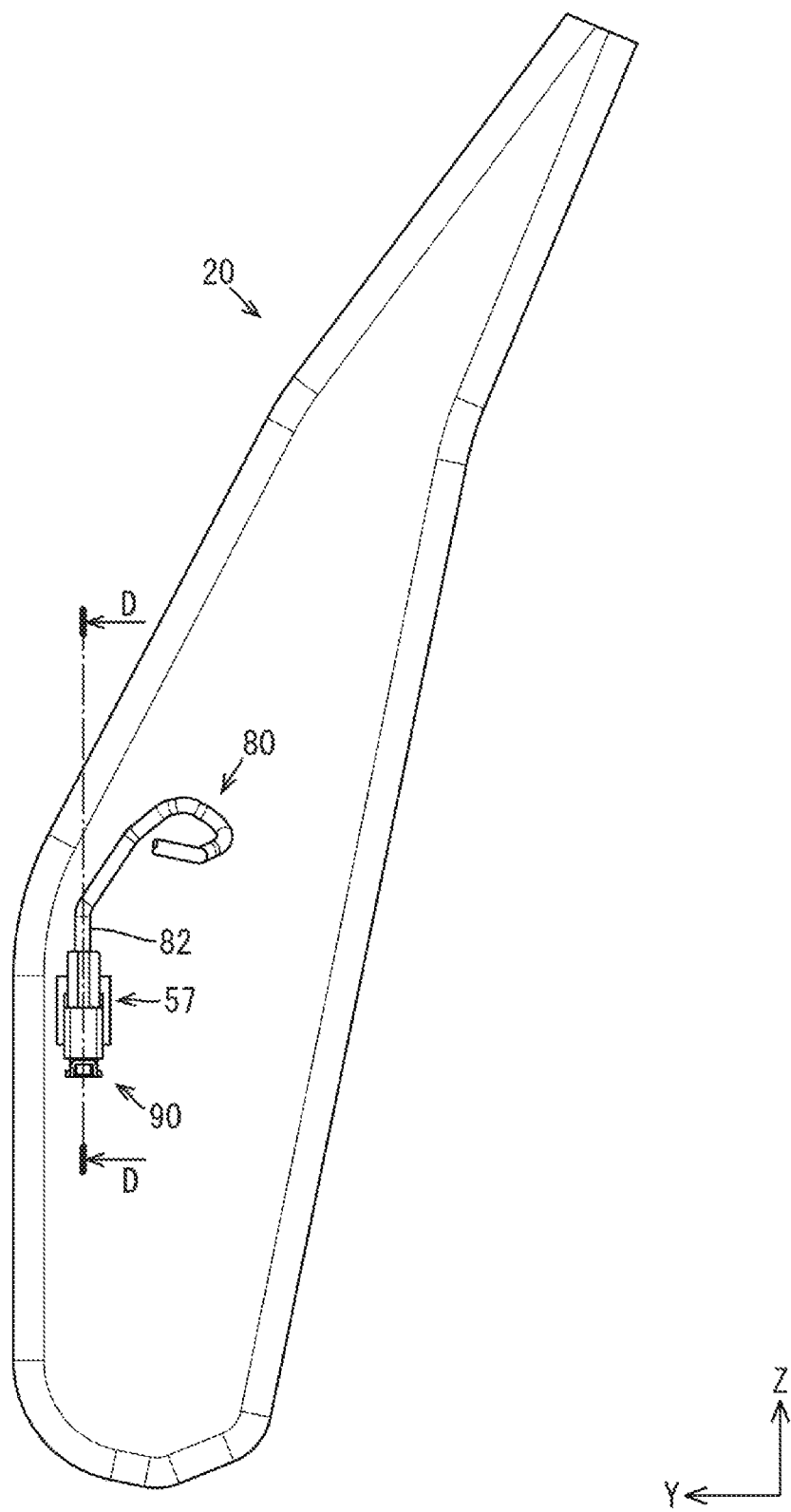
FIG. 11 is a side view of a seat frame.

A cable holder 55 is attached to a rear end of the first routing section 53A of the cable retaining portion 53. The cable holder 55 is made of synthetic resin. As illustrated in FIG. 10, the cable holder 55 includes a bundling portion 55A and a fitting portion 55B. The bundling portion 55A bundles and holds bundle portions 83 of the cable 80. The fitting portion 55B is fitted in a holding hole 56 in the frame 41 and held by the frame 41.

Figure 12:
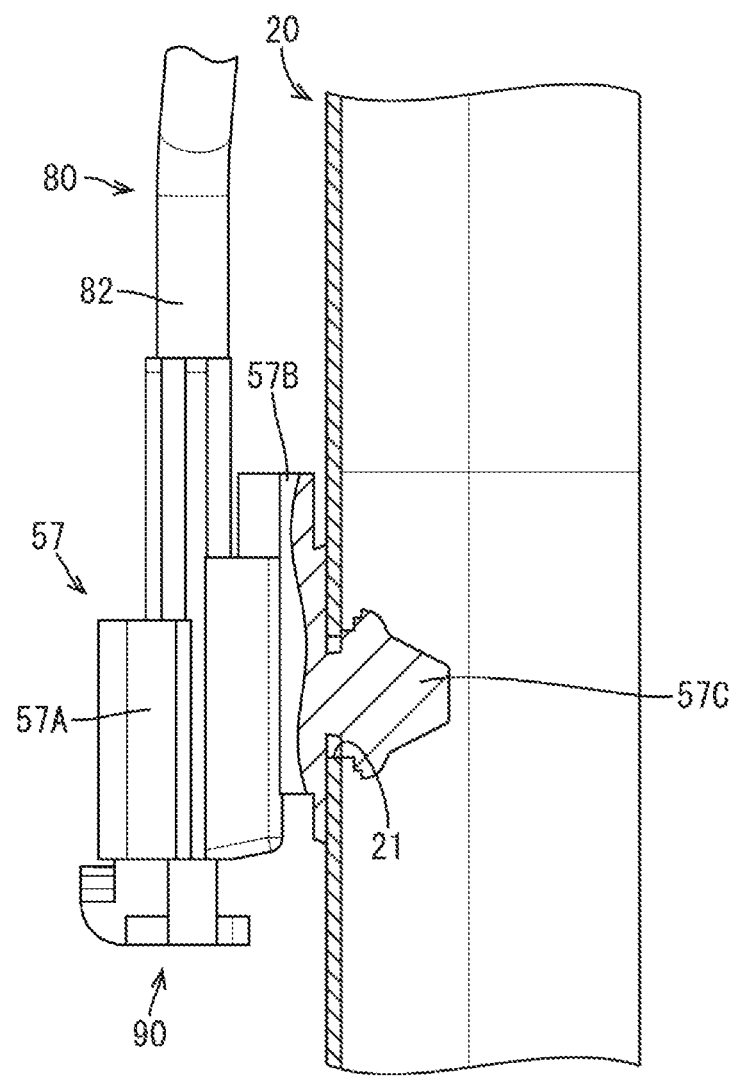
FIG. 12 is a cross-sectional view along line D-D in FIG. 11.

An end 81 of the cable 80 routed in the first routing section 53A is connected to the front device connecting port 46. An end 81 of the cable 80 routed in the second routing section 53B is connected to the rear device connecting port 47. Another end 82 of the cable 80 is connected to an armrest-side connector 57 illustrated in FIG. 12. The armrest-side connector 57 includes a connector fitting portion 57A and a fitting 57B. The seat-side connector 90 is fitted in the connector fitting portion 57A. The fitting 57B is fixed to the seat frame 20 such that the connector fitting portion 57A is detachable. As illustrated in FIG. 12, the fitting 57B includes a mounting protrusion 57C fitted in a mounting hole 21 in the seat frame 20.

The attachment wall 34 of the bracket 30 includes an elongated hole 37 through which the cable 80 is passed. The elongated hole 37 is in an arc form with the shank 71 of the bolt 70 as a center of curvature. A first end 37A of the elongated hole 37 overlaps the cable holder 55 of the armrest body 40 when viewed from the side in the vertical position illustrated in FIG. 6. The first end 37A overlaps the cable holder 55 of the armrest body 40 when viewed from the side in the vertical position illustrated in FIG. 7. The first end 37A of the elongated hole 37 is larger than a second end 37B of the elongated hole 37. The first end 37A is in a round form. A section of the cable 80 between the bundle portions 83 and the end 82 passing through the elongated hole 37 is pulled out of the armrest body 40 and the end 82 is fixed to the armrest body 40 with the cable holder 55. Because the elongated hole 37 is in the arc form with the shank 71 of the bolt 70 as the center of curvature, a distance between the bundle portions 83 and the elongated hole 37 remains constant during the rotation of the armrest body 40.

The end 82 of the cable 80 is fixed to the seat frame 20. Therefore, a distance between a section of the cable 80 passing through the elongated hole 37 and the end 82 varies during the rotation of the armrest body 40. Namely, during the rotation of the armrest body 40, a distance between the bundle portions 83 of the cable 80 and the end 82 varies according to a displacement of the bundle portions 83 relative to the end 82. Therefore, the cable 80 requires an extra section 84 between the bundle portions 83 and the end 82 so that the cable 80 is less likely to be pulled and broken even when the bundle portions 83 of the cable 80 is positioned the farthest from the end 82. As illustrated in FIG. 2, the extra section 84 is held inside the bracket 30.

As illustrated in FIG. 6, when the armrest body 40 is in the horizontal position, the bundle portions 83 held by the cable holder 55 are positioned the closest to the armrest-side connector 57 and thus the extra section 84 is loose. As illustrated in FIG. 6, when the armrest body 40 is in the vertical position, the bundle portions 83 held by the cable holder 55 are positioned the farthest from the armrest-side connector 57 and thus the extra section 84 is straightened. However, the extra section 84 is not completely straightened so that the extra section 84 can perform its function and thus the cable 80 is less likely to be broken.

This embodiment has the configuration described above. Next, effects of this embodiment will be described. Before that, a method of producing the armrest body 40 will be briefly described. The ends 81 of the cable 80 are passed through the front hole 51 and the rear hole 52. The end 81 of the cable 80 pulled out through the front hole 51 is connected to the front device connecting port 46. The end 81 of the cable 80 pulled out through the rear hole 52 is connected to the rear device connecting port 47. The front device connecting port 46 is fitted in the front hole 51. The rear device connecting port 47 is fitted in the rear hole 52.

The cable 80 is pushed into the cable retaining portion 53 and held by the retaining projections 54. Bundling of the bundle portions 83 of the cable 80 by the bundling portion 55A of the cable holder 55 is concurrently performed. The fitting portion 55B is fitted in the holding hole 56 to fix the cable holder 55 to the frame 41. Then, the frame 41 is covered with the cover 42 and set in a die. The foam 43 is injected to the space between the frame 41 and the cover 42 to form the armrest body 40.

Next, steps for attaching the armrest body 40 to the bracket 30 will be described. The end 82 of the cable 80 pulled out of the frame 41 is inserted into the elongated hole 37 in the bracket 30. The armrest body 40 is coupled to the attachment wall 34 of the bracket 30 with the bolt 70 and the nut 74. At this time, the guide pin 36 of the bracket 30 is inserted in the guide hole 45 in the frame 41. Through the steps, the armrest body 40 is attached to the bracket 30 to be rotatable. The rotation of the armrest body 40 is guided through the movement of the guide pin 36 in the guide hole 45.

Then, the armrest-side connector 57 is connected with the end 82 of the cable 80. The connector fitting portion 57A of the armrest-side connector 57 is fitted in the seat-side connector 90. The fitting 57B of the armrest-side connector 57 is fitted to the seat frame 20 to fix the armrest-side connector 57 to the seat frame 20. As illustrated in FIG. 6, when the armrest body 40 is in the horizontal position, the extra section 84 of the cable 80 is held inside the bracket 30.

When the armrest body 40 is rotated from the horizontal position to the vertical position, the cable 80 pulled out of the cable holder 55 toward the bracket 30 moves in the elongated hole 37 as the armrest body 40 rotates. As illustrated in FIG. 7, the extra section 84 is straightened. If the elongated hole 37 is not provided and a round hole is provided for the cable 80 to be passed through, a distance between the bundle portions 83 and the round hole is increased in the vertical position. The cable 80 needs to go around via the round hole and thus the cable 80 may require a significantly long extra section. In this embodiment, the elongated hole 37 that extends in a direction in which the armrest body 40 rotates is provided. Therefore, the cable 80 does not need to go around and thus the cable 80 requires only a shot length of the extra section 84. Namely, with the elongated hole 37, the length of the extra section 84 can be reduced as much as possible and the extra section 84 can be provided even the space is limited.

In this embodiment, the cable 80 pulled out of the cable retaining portion 53 of the armrest body 40 toward the seat frame 20 through the hole (the elongated hole 37) in the bracket 30 rotates along with the armrest body 40 during the rotation of the armrest body 40. The armrest-side connector 57 is connected to the seat-side connector 90 and fixed to the seat frame 20. Therefore, the cable 80 requires the extra section 84 between the hole and the armrest-side connector 57. In the configuration described earlier, the hole is provided in any one of the bracket 30 and the armrest body 40. Therefore, the cable 80 can freely move within the hole that allows the movement of the cable 80 and thus the armrest body 40 can be rotated with the cable 80 that includes the extra section 84 set in the limited space.

The hole may be the elongated hole 37.

The hole may be a clearance hole rather than the elongated hole 37. However, with the elongated hole 37, foreign substances are less likely to enter into the bracket 30 and the armrest body 40, that is, the elongated hole 37 has an advantage over the clearance hole.

The cable holder 55 for holding the cable 80 to the armrest body 40 may be provided at the end of the cable retaining portion 53 on the opposite side from the device connecting port (the front device connecting port 46, the rear device connecting port 47). The elongated hole 37 may be provided in the bracket 30. The elongated hole 37 may be in the arc form with the center of rotation of the armrest body 40 (the shank 71 of the bolt 70) as the center of curvature. The cable 80 pulled out of the cable holder 55 toward the bracket 30 may move in the elongated hole 37 along with the rotation of the armrest body 40.

According to the configuration, because the elongated hole 37 is provided in the bracket 30 and the elongated hole 37 is in the arc form with the rotation axis of the armrest body 40 as the center of curvature, the distance between the cable holder 55 and the elongated hole 37 remains constant.

The armrest body 40 is rotatable between the horizontal position and the vertical position. The front device connecting port 46 and the rear device connecting port 47 may be provided at the front end and the rear end of the armrest body 40 in the horizontal position, respectively.

According to the configuration, the occupant of the vehicle in the front seat can use the front device connecting port 46 and the occupant of the vehicle in the rear seat can use the rear device connecting port 47. Namely, the device connecting ports are provided for both the front seat and the rear seat.

The rear device connecting port 47 may be located more to the rear side than the vertical axis P that passes the rotation axis of the armrest body 40 in the horizontal position. The rear device connecting port 47 may be located more to the rear side than the vertical axis P in the vertical position as well.

According to the configuration, the rear device connecting port 47 can be used in either position.

The bracket 30 may include the guide pin 36 and the armrest body 40 may include the guide hole 45 in the arc form with the rotation axis of the armrest body 40 as the center of curvature. The guide hole 45 may guide the guide pin 36 during the rotation of the armrest body 40.

According to the configuration, movement of the guide pin 36 in the guide hole 45 guides the rotation of the armrest body 40. The load applied to the armrest body 40 is less likely to be concentrated on the rotation axis and spread to the guide pin 36.

OTHER EMBODIMENTS

The technology described herein is not limited to the embodiments described above and illustrated in the drawings. For example, the following embodiments will be included in the technical scope of the technology described herein.

(1) In the above embodiment, the elongated hole 37 is provided in the bracket 30. However, the armrest body 40 may include an elongated hole and the extra section may be disposed inside the armrest body 40.

(2) In the above embodiment, the elongated hole 37 is in the arc form with the shank 71 of the bolt 70 as the center of curvature. However, the elongated hole may be provided in a linear form or a clearance hole larger than the elongated hole may be provided.

(3) In the above embodiment, the armrest body 40 includes the front device connecting port 46 and the rear device connecting port 47. However, the armrest body 40 may include only one of the front device connecting port 46 and the rear device connecting port 47.

(4) In the above embodiment, the rear device connecting port 47 is disposed more to the rear side than the vertical axis P. However, the rear device connecting port may be disposed more to the front side than the vertical axis P as long as it is accessible by the occupant of the vehicle in the rear seat.

(5) In the above embodiment, the bracket 30 includes the guide pin 36. However, the armrest body 40 may include a guide pin.

(6) In the above embodiment, the USB ports are provided as examples of the device connecting ports. However, the device connecting ports may be phone jacks or cigarette lighter sockets.

EXPLANATION OF SYMBOLS

10: Armrest
20: Seat frame
30: Bracket
36: Guide pin
37: Elongated hole (Hole)
40: Armrest body
46: Front device connecting port
47: Rear device connecting port
53: Cable retaining portion
55: Cable holder
57: Armrest-side connector
70: Bolt
71: Shank (Rotation axis)
80: Cable
81: End
82: End
P: Vertical axis

What is claimed is:

1. An armrest comprising:
a bracket fixed to a seat frame;
an armrest body attached to the bracket to be rotatable;
at least one device connecting port exposed through an outer surface of the armrest body;
an armrest-side connector fixed to the seat frame at a position different from the bracket; and
a cable including an end connected to the at least one device connecting port and an end connected to the armrest-side connector, wherein
the armrest body includes a cable retaining portion through which the cable is passed and in which the cable is retained, any one of the bracket and the armrest incudes a bolt hole through which a shank of a bolt for attaching the armrest body to the bracket is passed, an elongated hole in which the cable moves along with rotation of the armrest body, and a guide pin that moves in a guide hole provided in another one of the bracket and the armrest body for guiding the rotation of the armrest body, and the elongated hole is provided between the bolt hole and the guide pin.

2. The armrest according to claim 1, further comprising a cable holder for holding the cable with the armrest body at an end of the cable retaining portion on an opposite side from the at least one device connecting port, wherein the elongated hole is provided in the bracket,
the elongated hole is in an arc form with a rotation axis of the armrest body as a center of curvature, and
the cable pulled out of the cable holder toward the bracket moves in the elongated hole along with the rotation of the armrest body.

3. The armrest according to claim 1, wherein the armrest body is rotatable between a horizontal position and a vertical position, and
the at least one device connecting port includes a front device connecting port disposed at a front end of the armrest body in the horizontal position and a rear device connecting port disposed at a rear end of the armrest body in the horizontal position.

4. The armrest according to claim 3, wherein the rear device connecting port is disposed more to a rear side than a rotation axis about which the armrest body rotates, and the rear device connecting port is disposed more to the rear side than the rotation axis when the armrest body is in the horizontal position and in the vertical position.

5. The armrest according to claim 4, wherein the bracket includes the guide pin,
the armrest body includes the guide hole in an arc form with the rotation axis as a center of curvature, and
the guide hole guides the guide pin along with rotation of the armrest body.

* * * * *